Figure 1:
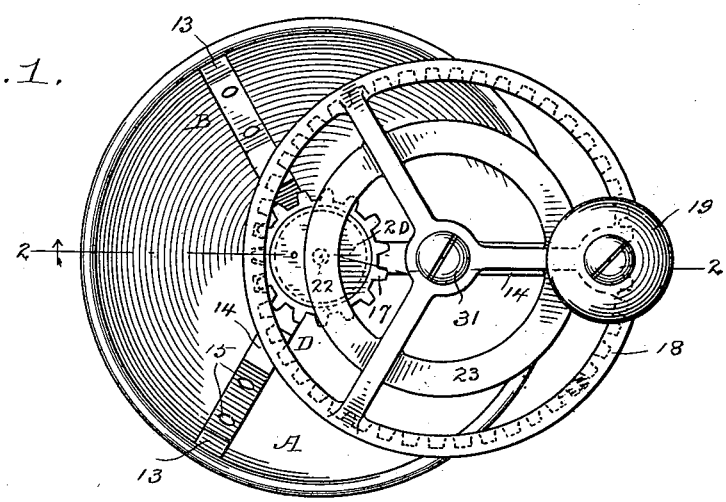

No. 663,305. Patented Dec. 4, 1900.
P. B. TINGLEY.
EGG BEATER OR CREAM WHIPPER.
(Application filed Jan. 5, 1900.)

(No Model.)

WITNESSES
H. A. Lamb
S. H. Atherton

INVENTOR
Philo B. Tingley
By
H. M. Wooster
Atty.

UNITED STATES PATENT OFFICE.

PHILO B. TINGLEY, OF NEW YORK, N. Y.

EGG-BEATER OR CREAM-WHIPPER.

SPECIFICATION forming part of Letters Patent No. 663,305, dated December 4, 1900.

Application filed January 5, 1900. Serial No. 448. (No model.)

*To all whom it may concern:*

Be it known that I, PHILO B. TINGLEY, a citizen of the United States, residing at New York, county of New York, State of New York, have invented a new and useful Egg-Beater or Cream-Whipper, of which the following is a specification.

My invention has for its object to provide a culinary implement adapted for general use as an egg-beater, cream-whipper, &c., which shall be simple and inexpensive to produce, easily operated, not likely to get out of repair, and which will produce the best possible results—that is, beat eggs or whip cream to the greatest possible degree of lightness and in less time than it has heretofore been possible to accomplish such a result.

With these ends in view I have devised the simple and novel egg-beater and cream-whipper which I will now describe, referring to the accompanying drawings, forming part of this specification, and using reference characters to designate the several parts.

Figure 2:
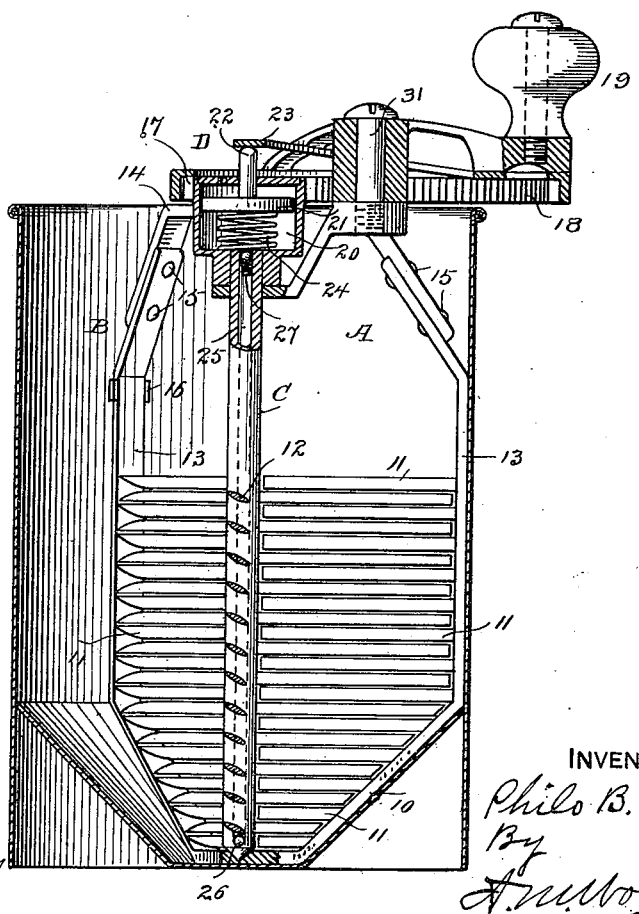

Figure 1 is a plan view of one form of my novel implement complete; Fig. 2, a vertical section on the line 2 2 in Fig. 1.

My novel implement comprises the following essential elements: a reservoir or holder, which I have indicated by A and which is ordinarily provided with an inclined bottom 10, a removable frame B, adapted to be received by the reservoir and provided with two or more series of inwardly-extending inclined blades 11, a vertical rotary shaft C, also provided with series of inclined blades, which I have indicated by 12, and an aerating device, which I have indicated by D. This aerating device may be a pump and be operated in connection with the shaft of the implement, as shown in the drawings, or may, if preferred, be an ordinary bulb.

In the present instance I have shown the frame as consisting of three arms 13, said arms, in connection with the inclined blades 11, being shown as cast in a single piece, although said parts may, if preferred, be made in several pieces and fastened together, and a top 14, which is riveted to the arms, as at 15. The frame is preferably made to fit closely in the reservoir and is held in position therein by lugs 16, which are adapted to lie on opposite sides of one of the arms of the frame. Shaft C is journaled in the top and in the frame at the bottom. If the reservoir is provided with an inclined bottom, as in the drawings, the arms are necessarily shaped to correspond therewith, and the lower inclined blades 12 are correspondingly shortened, as clearly shown in Fig. 2, and in order that the lower blades, which extend outward from the shaft, may closely fit or correspond with the shape of the bottom the outer ends of said blades are beveled, as clearly shown in Fig. 2. The object of providing an inclined bottom is to enable the implement to operate equally well upon a small quantity of material—as, for example, the white of a single egg or a very small quantity of cream. It will be noted that blades 11 and 12 are inclined in opposite directions, the inclination of the blades upon the shaft, as seen in end elevation, being from the left downward toward the right, as is clearly shown in Fig. 2, in which blades extending from the shaft toward the point of view are shown in section. This special inclination of the blades upon the shaft is in order that when the shaft is being turned toward the right the action of the blades will be downward upon the liquid that is being beaten, the effect of which is to keep the liquid down by counteracting centrifugal action which will normally cause the liquid to rise up the side of the reservoir toward the open top.

The beating action of the oppositely-inclined blades is greatly assisted and the result hastened by the action of the aerating device, by means of which air is forced into the bottom of the reservoir during the beating or whipping operation. I have shown the shaft as provided at its upper end with a pinion 17, which is driven by a gear-wheel 18, having a suitable crank 19. This gear-wheel may be either in the vertical plane or the horizontal plane, as preferred, and may be journaled upon a stud 31, extending from the top, as shown in the drawings, or upon a stud extending from a bracket 32, secured to the top. In the form shown in the drawings the aerating device is an air-pump, so constructed as to be operated by rotation of the gear-wheel. In this form I have shown the pinion as provided with an air-chamber 20, within which is a piston 21, provided with a rod 22, which extends upward through the top of the pinion and is engaged by a cam 23, carried by the gear-wheel. Beneath the piston is a spring 24, the action of which is to raise the piston and hold the rod in close engagement with the cam, it being obvious from Fig. 2 that when the rod is in engagement with the high portion of the cam the spring will raise the piston, as in said figure, and that when the low portion of the cam is in engagement with the rod the piston will be forced downward against the power of the spring. The air-chamber opens into a passage 25 in the shaft, which has its outlet 26 near the bottom of the reservoir. A valve 27 is placed at the upper end of the passage or wherever is best adapted to the requirements of the special use for which the implement is intended.

When the implement is in use, the rotation of the blades in the described direction, owing to their being inclined, not only has the effect of counteracting the effect of centrifugal action, as above described, but also said inclination of the blades serves to prevent the too-rapid rise of air through the contents of the reservoir.

Having thus described my invention, I claim—

1. In a device of the character described the combination with a reservoir and a frame having inwardly-extending blades, of a vertical shaft having a passage through it and carrying alternating blades and at its upper end a pinion, an air-pump whose piston is provided with a rod extending through the top of the pinion and a gear-wheel meshing with the pinion and carrying a cam which engages the rod and actuates the air-pump.

2. In a device of the character described the combination with a shaft having a passage through it, at its upper end a pinion having an air-chamber communicating with the passage, a piston in said air-chamber having a rod passing through the top of the pinion, a spring acting to raise the piston and a valve, of a gear-wheel meshing with the pinion and having a cam engaging the rod, substantially as shown, for the purpose specified.

In testimony whereof I affix my signature in presence of two witnesses.

PHILO B. TINGLEY.

Witnesses:
V. M. PECK,
R. M. PRIOR.